(12) United States Patent
Weskström et al.

(10) Patent No.: US 8,718,309 B2
(45) Date of Patent: May 6, 2014

(54) SPEAKER APPARATUS COMBINING EARPIECE AND HANDS FREE FUNCTIONS

(75) Inventors: Anders Weskström, Espoo (FI);
Benedict Slotte, Turku (FI)

(73) Assignee: Nokia Corporation, Espoo (FI)

( * ) Notice: Subject to any disclaimer, the term of this patent is extended or adjusted under 35 U.S.C. 154(b) by 1205 days.

(21) Appl. No.: 11/920,684

(22) PCT Filed: Jun. 29, 2006

(86) PCT No.: PCT/FI2006/000232
§ 371 (c)(1),
(2), (4) Date: Nov. 19, 2007

(87) PCT Pub. No.: WO2007/000485
PCT Pub. Date: Jan. 4, 2007

(65) Prior Publication Data
US 2009/0233651 A1    Sep. 17, 2009

(30) Foreign Application Priority Data

Jun. 29, 2005 (FI) ...................................... 20050691

(51) Int. Cl.
*H04R 9/06* (2006.01)
(52) U.S. Cl.
USPC ........... 381/334; 381/332; 381/345; 381/346; 381/347; 381/348; 381/351; 379/420.02; 379/433.02

(58) Field of Classification Search
USPC ............. 381/332, 334–348, 351; 379/420.01, 379/420.02, 433.01, 433.02; 455/569.1
See application file for complete search history.

(56) References Cited

U.S. PATENT DOCUMENTS

| | | | | |
|---|---|---|---|---|
| 5,790,679 A | * | 8/1998 | Hawker et al. ................. | 381/163 |
| 6,104,808 A | | 8/2000 | Alameh et al. ................. | 379/433 |
| 6,144,738 A | | 11/2000 | Hawker et al. ................. | 379/433 |
| 2002/0136398 A1 | | 9/2002 | Dufosse et al. .......... | 379/428.01 |
| 2003/0032443 A1 | | 2/2003 | Johnson et al. ............... | 455/550 |
| 2003/0086562 A1 | | 5/2003 | Wong et al. ............. | 379/420.01 |
| 2005/0069164 A1 | | 3/2005 | Muthuswamy et al. ...... | 381/369 |

FOREIGN PATENT DOCUMENTS

| | | |
|---|---|---|
| CN | 1383310 A | 12/2002 |
| EP | 1091539 A2 | 4/2001 |
| JP | 2001285428 | 12/2001 |
| JP | 2002165289 | 7/2002 |

* cited by examiner

*Primary Examiner* — Ramon Barrera
(74) *Attorney, Agent, or Firm* — Harrington & Smith

(57) ABSTRACT

In the invention a speaker apparatus acoustically combines the earpiece and hands free functions. Thus a speaker has acoustically separated functions for acting as the earpiece and as the hands free. The speaker apparatus has a back cavity having an outlet so that the damped sound of the outlet operates as the earpiece. The front of the speaker apparatus operates as the louder hands free.

25 Claims, 7 Drawing Sheets

SPEAKER APPARATUS COMBINING EARPIECE AND HANDS FREE FUNCTIONS

TECHNICAL FIELD OF THE INVENTION

The invention concerns a speaker apparatus of a wireless communication device and a wireless communication device comprising the speaker apparatus. Yet furthermore the invention concerns a method for controlling such apparatuses. Yet furthermore the invention concerns a computer program for controlling the apparatuses.

BACKGROUND ART

A portable hand-held apparatus such as a mobile phone comprises a speaker apparatus nowadays. An acoustic audio technology plays important role for the actual user of such apparatus. A mobile phone can have an earpiece speaker and an integrated hands free (IHF) speaker. The earpiece speaker can be a device which is held against the user's ear to listen, whereas the IHF speaker can be a device, which has loud enough sound to allow the user to listen at arms-length distance, holding the mobile communications device in his hands or on letting the mobile device being on a table etc. The IHF speaker can be built into the same mobile communications device as the earpiece. Typically the earpiece speaker and the IHF speaker have different sound outlets. However, two separate speakers require a lot of space. This is problematic following the miniaturizing trend of the portable hand-held apparatuses.

Thus a known mobile phone has both the earpiece and the integrated hands-free speaker. However, some conflicting requirements arise with respect to the ear-piece and the hands free. Sound at arms-length distance in the "hands-free" use should be loud enough, but sound into the ear in "earpiece" use should not be too loud (i.e. to avoid potential hearing damage). While it is possible to include electronic level control, proximity sensors etc., the protection functionality of these solutions is sometimes uncertain. Thus the protection of the user's ear against accidental too loud earpiece sound pressures should preferably be implemented more securely, i.e. not only electronically or mechanically.

Protecting the ear from too loud accidental sound pressures can be accomplished in the following ways. In a known solution a proximity sensor prevents loud sound output, when something is close to the earpiece sound outlet. In another solution a bypass outlet passes most of the sound out through some other opening than the one that is held against the ear. In yet another known solution a user-engaged mechanical switch opens/closes the sound outlets leading to the ear and at the same time engages electronic level control. The disadvantage of these solutions is that they demand quite much from mechanical and industrial design. Therefore more space is required. Complex design must be effected. Moreover the solutions are vulnerable to malfunctions etc.

SUMMARY OF THE INVENTION

It is therefore the object of the invention to acoustically combine the speaker functionalities while taking into account the miniaturization trend and safety aspects of the wireless communication devices.

In accordance with a first aspect of the invention, there is provided a speaker apparatus comprising: a vibrating element encapsulated by a housing of the speaker apparatus, so that a cavity is established next to the vibrating element in the housing, wherein the housing comprises a first outlet for emitting a sound generated by the vibrating element, and wherein the cavity comprises a second outlet for emitting a damped sound with respect to said sound.

According to some embodiments of the invention the sound and the damped sound are generated by the same vibrating element of the speaker apparatus. According to some embodiments of the invention the first and the second outputs are facing different sides of the speaker apparatus. Sound for the first outlet is taken from the other side of the vibrating element than sound for the second outlet. The outlets are directed to different directions. According to a further embodiment the first and the second outlets are in opposite sides of the speaker apparatus.

In accordance with a second aspect of the invention, there is being provided a wireless communication device comprising a single speaker, wherein the single speaker comprises means for acoustically combining an earpiece speaker functionality of the mobile phone and hands free speaker functionality of the mobile phone.

According to some embodiments of the invention the earpiece speaker functionality and the hands free speaker functionality have a common vibrating element and dedicated outlets on different sides of the single vibrating element. The first of the dedicated outlets carries outs the IHF functionality and the second of the dedicated outlets carries out the earpiece speaker functionality.

In accordance with third aspect of the invention, there is being provided a method for controlling a speaker apparatus comprising a vibrating element, wherein the method comprises:

providing sound generated by the vibrating element to a first outlet operating as a hands free speaker and providing sound generated by the vibrating element to a second outlet operating as an earpiece speaker.

According to some embodiments of the invention sound emitted via the first outlet and sound emitted via the second outlet are originating from different, separate sides of the single vibrating element.

In embodiments of the invention a speaker apparatus acoustically combines the earpiece and hands free functions. The speaker structure according to the various embodiments has two outlets for producing sound all the time. Thus a speaker has acoustically separated functions for acting as the earpiece and as the hands free. The speaker apparatus according to various embodiments has a cavity having an outlet so that the dampened sound through this outlet operates as an earpiece. On another side the speaker apparatus has another outlet, which operates as hands free outputting louder sound compared to dampened sound outlet. The mentioned outlets a situated on different sides of the speaker apparatus, thereby producing sound in different directions. There are outputs on both sides of the vibrating element.

The speaker apparatus combining two acoustic constructions has a compact structure. According to an embodiment the earpiece and the closed-box integrated hands-free are combined back to back in a compact size, while still protecting the ear against too loud sound. Thus integrated and miniaturised speaker apparatus can flexibly fit into preferable locations in small devices. Furthermore the constructions are quite simple thereby providing less malfunctioning speaker apparatus. It should be noted that in embodiments the invention even when the other sound outlet is blocked for whatever reason, the sound pressure entering the ear through the earpiece sound outlet is still limited. Thus the protection from too loud sound is taken into account. Although the combined construction means that quite much sound will always leak out and in "earpiece" use speech privacy is therefore reduced, this can be balanced against required ear protection by proper design of the construction.

In further embodiments the sound of the integrated hands free speaker and the earpiece speaker generated by the vibrating element is generated from different sides of the vibrating element. Thus a single vibrating element generates the sound for both the hands free and the earpiece speaker. The general structure of the speaker apparatus and parts forming the speaker control the sound pressure levels entering both the ear and to the free space.

BRIEF DESCRIPTION OF THE DRAWINGS

The invention will now be described by way of examples only with reference to the accompanying drawings, in which.

DESCRIPTION OF FURTHER EMBODIMENTS

Figure 1:
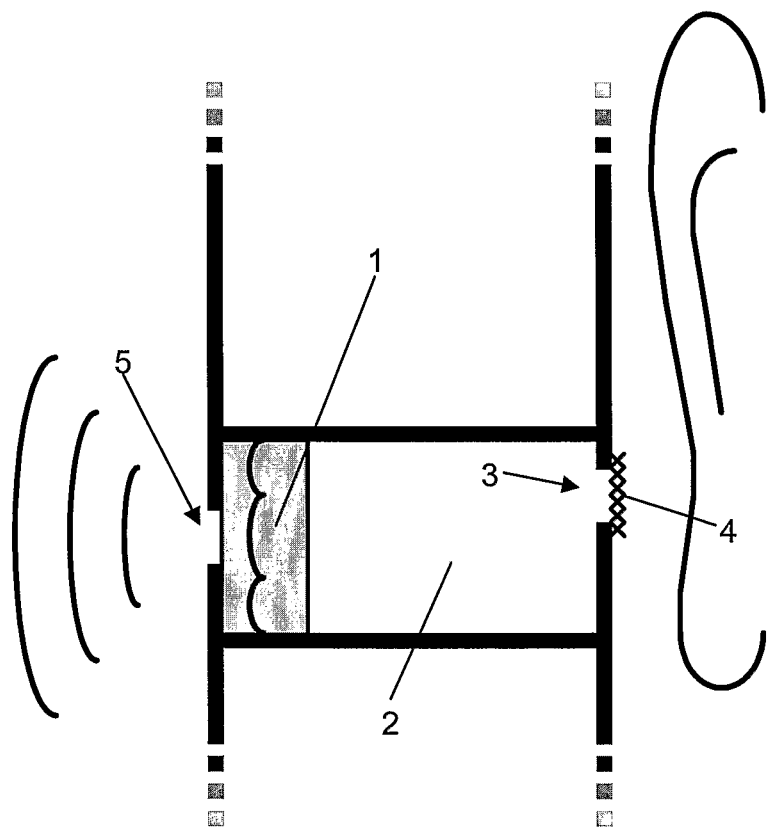
FIG. 1 depicts a cross-section of the apparatus that acoustically combines ear-piece and hands-free functions in accordance with a further embodiment of the invention.

FIG. 1 is depicts a cross-section of an apparatus acoustically combining the earpiece and the integrated hands-free (IHF) function in accordance with a further embodiment of the invention. A speaker apparatus 100 comprises a vibrating element 1. The vibrating element 1 can be alternatively referred to as a loudspeaker element or a speaker membrane. One side of the vibrating element 1, inside the speaker housing, is enclosed in an air cavity 2 typically having a volume of a couple of cm3. The cavity 2 has a sound outlet 3, generally referred herein as a second outlet. According to an embodiment the second sound outlet 3 includes controlled acoustic damping 4. This damping 4 can be chosen so that the maximum sound level entering the ear stays below some given limit, e.g. 120 dB or something else. Thereby the user can use the second outlet 3 of the construction 100 as an earpiece.

The apparatus 100 also comprises another sound outlet 5, generally referred here as a first outlet, on the other side of the vibrating element 1. The first outlet 5 and the second outlet 3 are emitting sound from the speaker apparatus to different directions. Generally the louder sound pressure and the lower sound pressure are taken from different sides of the vibrating element 1. According to an embodiment the first and the second outlets are on opposite sides of the speaker apparatus 100. Sound radiated through the first sound outlet 5 is much louder than sound radiated through the second sound outlet 3. Thus first outlet 5 is used for the integrated hands free (IHF) function. Thereby the apparatus 100 can act as the earpiece speaker and the hands free speaker. The cavity 2 acts as a back cavity for the IHF. The second outlet 3, being the outlet for the earpiece speaker, is so small that IHF performance is only slightly degraded.

Furthermore the speaker apparatus 100 can be contained in the closed-box structure which can advantageously fit into tight space requirements of a small device, such as a wireless communication device or a mobile phone. The combined earpiece and hands free speaker structure according to embodiments can be fitted into various locations of a small device.

Figure 2:
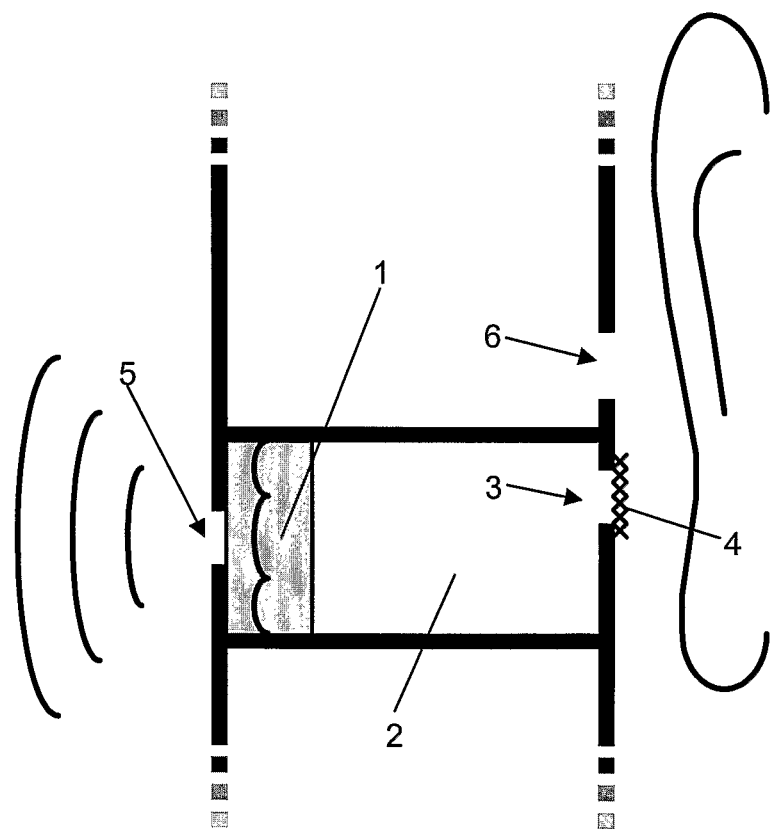
FIG. 2 depicts another further embodiment of the invention in which a leak (6) has been added to the earpiece.

In a further embodiment of the invention, shown in FIG. 2, an additional external leak outlet 6 is arranged to the earpiece side of the construction, or nearby the earpiece. This leak outlet 6 leads to the outside of the speaker apparatus or of the device comprising the speaker apparatus (directly or indirectly). The leak 6 is typically designed to improve the acoustic performance of the earpiece. According to an embodiment the leak 6 smooths the sound peaks, which would otherwise cause too high sound pressure towards the ear. Furthermore the leak 6 improves the sound spectrum of the earpiece. The external leak output 6 of the speaker apparatus makes the sound level less dependent on how the device comprising such speaker apparatus is held against the ear of the user.

Figure 3:
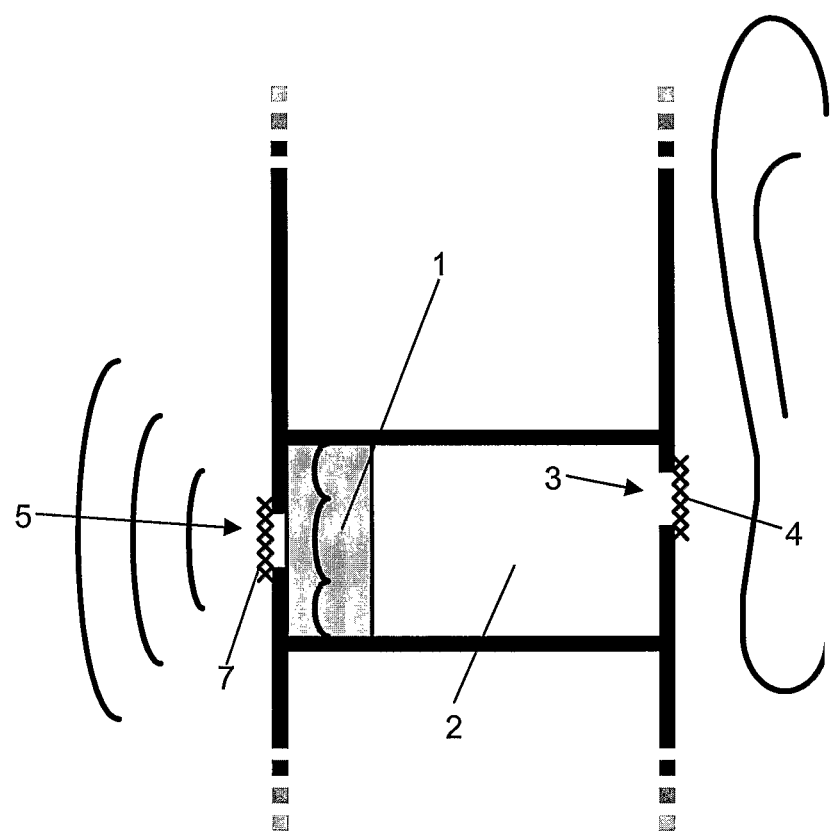
FIG. 3 depicts yet another further embodiment of the invention in which acoustic damping material (7) has been added to the sound outlet of the IHF.

In yet another further embodiment of the invention, shown in FIG. 3, acoustic damping material 7 is added to the IHF sound outlet 5. The damping material is typically designed to improve the acoustic performance of both the IHF and the earpiece. For example the damping material 7 smooths the sound spectrum of the IHF sound outlet 5. A damping 4 is attenuating the second outlet 3 of the earpiece speaker and a damping 7 is attenuating the first outlet 5 of the IHF speaker. Damping 4 on the earpiece side may be stronger, and generally damping 7 on the IHF side is attenuating acoustically only a little, or it might not exist at all. Damping according to an embodiment is situated essentially next to the corresponding outlet. It should be noted that it is not essential to the invention how a damping is situated, e.g. on which side of the outlet opening it is placed. Generally a damping is situated "on" the outlet opening and covering it.

Figure 4:
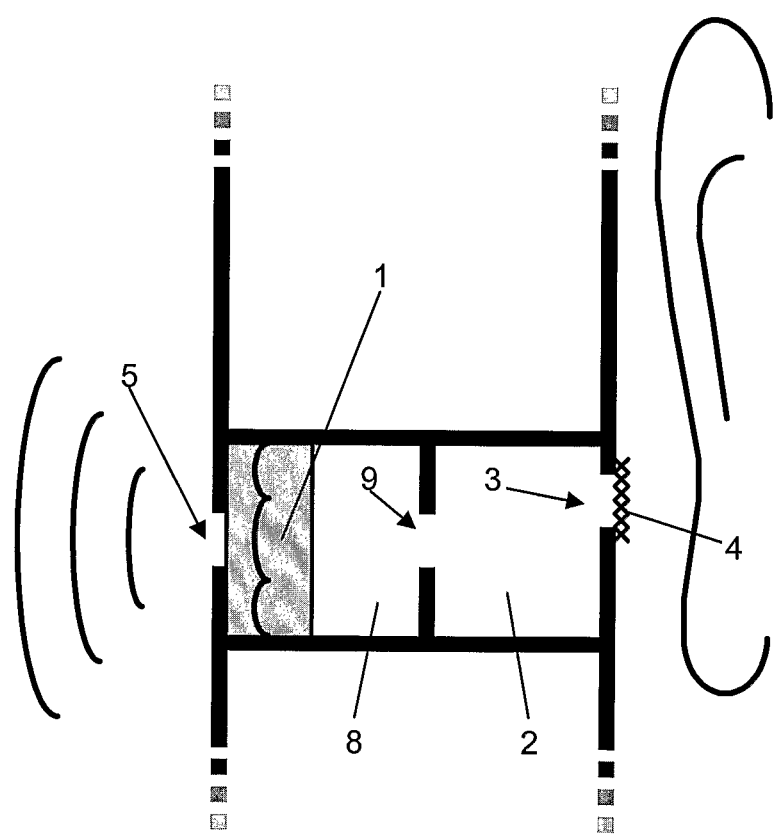
FIG. 4 depicts yet another further embodiment of the invention in which the cavity has been divided into two parts (2, 8) with a third sound outlet (9) between them.

In yet another further embodiment of the invention, shown in FIG. 4, the cavity on one side of the vibrating element 1 is divided into two parts (2, 8) with a third sound outlet 9 between them. Here the speaker apparatus contains an additional cavity 8 and a further third sound outlet 9. The cavity 8 and the third sound outlet 9 can be designed to further improve the acoustic performance of both the earpiece and the IHF. According to an embodiment the outer cavity 2, next to the ear in FIG. 4, can be tuned to boost the high frequency response of the earpiece.

Figure 5:
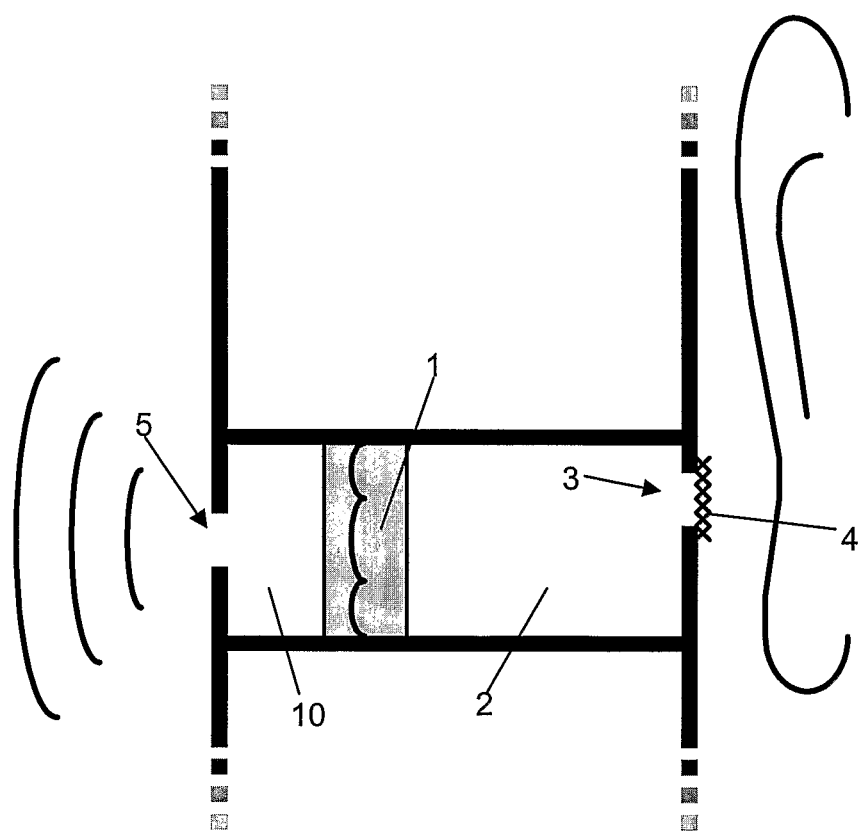
FIG. 5 depicts yet another further embodiment of the invention in which a cavity (10) has been added also to the other side of the vibrating element (1)

In yet another further embodiment of FIG. 5 shows a cavity 10 also on the other (IHF-)side of the vibrating element 1. Thus the speaker apparatus contains an additional cavity 10 next to the first outlet 5. Cavity 10 on the IHF-side of the vibrating element 1 is usually smaller than cavity 2 on the earpiece side of the vibrating element. Generally the IHF-side cavity 10 forms a front cavity and the earpiece side cavity 2 forms a back cavity. The cavity 10 can be designed to further improve the acoustic performance of both the earpiece and the IHF. The additional cavity 10 and the first sound outlet 5 form a (smallish) acoustic resonator. According to an embodiment the resonator is tuned to a given frequency, e.g. 3 kHz. According to an embodiment the additional cavity 10 and the first outlet 5 act as a resonator that boosts the high frequency response of the IHF.

Figure 6:
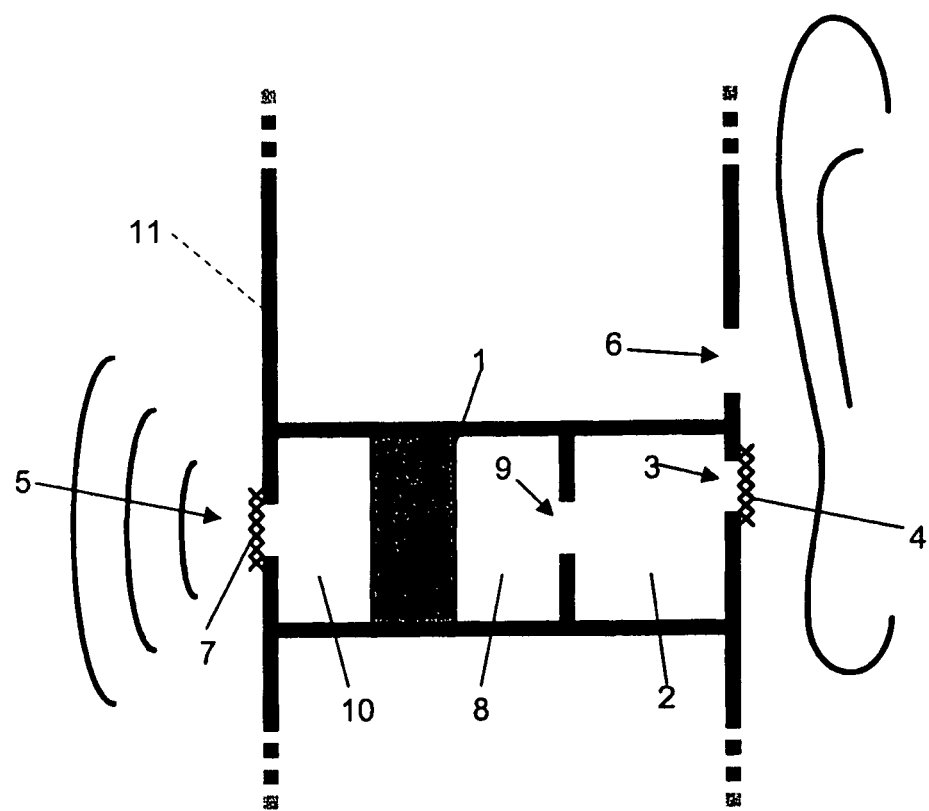
FIG. 6 depicts yet another further embodiment of the invention in which all the features of the previous embodiments can be combined.

In yet another embodiment of the invention, shown in FIG. 6, the features of the previously described embodiments have been included in one or a single construction. The construction of FIG. 6 has vibrating element 1, an additional cavity 10 and the first outlet 5 with an acoustic dampening 7 used for the IHF functioning. The cavity on the other side of the vibrating element 1 is divided into two 2, 8 cavities having a sound outlet 9 in between. The second outlet 3 has a dampening 4 for maintaining the sound pressure of the second outlet 3 in certain level, even when IHF operates at maximum level. The external leak outlet 6 smooths the frequency response of the earpiece. The additional cavity 10, the first outlet 5 and the acoustic dampening 7 form so called damped resonator on the IHF side. The damped resonator can be tuned to further flatten the frequency response of the earpiece.

Accordingly various combination of the embodiments can be made without departing from the spirit of the invention. It should be also noted that further embodiments are possible by combining these features in different ways. According to the embodiments of the invention there exists two separate outlets for outputting sound. The two outlets are essentially leading to different directions, and sound for the outputs is taken from separate sides of the vibrating loudspeaker membrane. The outlets can situate on opposite sides of the speaker (device) construction. Generally the construction has two or more sides that can be used by the user as "a front side" depending on which outlet the user intends to hear the sound from. Thus front side and back side, as well as front and back cavities, and other relative terms are examples of the functioning and structure, as depicted here. However such relative terms are not restricting the scope to only such placing or orientation, but allow deviation within the scope and spirit of the invention. Furthermore generally a loudspeaker apparatus can be put in any direction, thus if a design has both front cavity and back cavity, the loudspeaker "front" can be facing either front or back cavity.

According to an embodiment of the present invention an outlet of an IHF speaker is at least partly coverable. According to one embodiment the first outlet 5 is designed so that user can cover or close the outlet 5 at least partly. Generally design allows covering to be done by a mere finger or by a press of a finger. By at least partly covering the outlet of an IHF, and thereby reducing the sound level leaking out from the device, user will achieve more privacy. According to embodiments of the invention a switch 11 is added to the construction such that the switch 11 is arranged to close or cover the outlet 5 of the IHF speaker at least partly. The switch 11 can be a mechanical switch, or any suitable type of a switch. Generally user can open or close the switch 11. When the switch 11 closes an outlet, the level of the sound leaking out via the outlet is reduced. Such covered IHF outlet may, in some cases, affect the sound quality, but in general gained sound leak reducing, which can be significant, overrides the possible disadvantage, especially in situations, where privacy is needed. With at least partly covered outlet 5 of the IHF speaker according to the embodiments of the present invention, the user of the device has more privacy, and other people nearby cannot as easily hear or eavesdrop user's private communication.

Figure 7A:
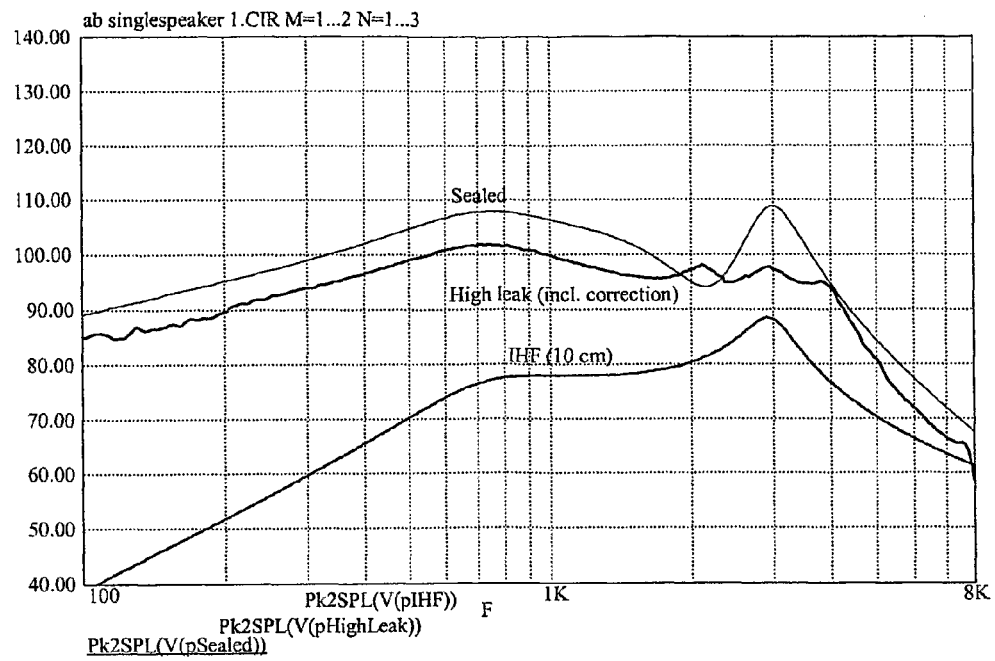
FIGS. 7a & 7b depict simulation results of further embodiment.
Figure 7B:
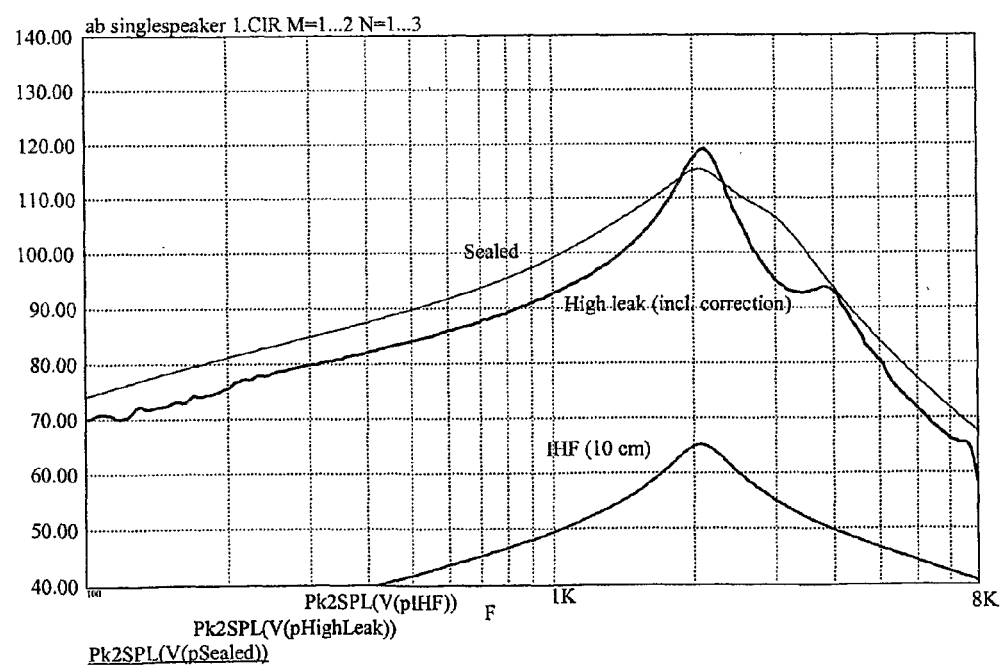

FIGS. 7a and 7b depict simulation results. In FIG. 7a the sound pressure level vs frequency is shown for 3 different cases: ear sealed against earpiece with integrated hands-free at maximum output level, ear loosely held against earpiece, and integrated hands-free output at 5 cm distance. The information contained in this picture is that the maximum sound pressure level entering the ear stays below 120 dB even at maximum output, and thus there is no risk of ear damage. In FIG. 7b the worst-case situation is shown: the unlikely case that all the extra sound outlets are blocked and only the one leading directly into the ear is open. Even now the maximum sound pressure stays low enough to avoid ear damage.

The wireless communication device can be a mobile handheld terminal operable in mobile communications network. However there are various ways to implement the wireless communication device. A mobile phone is an example of the wireless communication device in which various further embodiments can be implemented.

Handheld Devices

Handheld devices are usually battery powered and are becoming a usual companion in our day-to-day nomadic activities. Besides some of them, like the cellular mobile phones would easily allow interactive applications since they have the return channel. Examples of handheld devices: Cellular mobile phones. PDAs: they have the advantage to have, generally speaking, bigger screens than mobile phones, however there is a tendency to mix both devices. Portable videogame devices: their main advantage is that the screen is very well prepared for TV applications and that they are becoming popular between e.g. youngsters.

Portable Devices

Portable devices are those that, without having a small screen, are nomadic and battery powered. As an example: Flat screen battery powered TV set: there are some manufacturers that are presenting such devices, as an example of their use: to allow a nomadic use inside the house (from the kitchen to the bedroom). Portable DVD players, Laptop computers etc. are other examples.

RAMIFICATIONS AND SCOPE

Although the description above contains many specifics, these are merely provided to illustrate the invention and should not be constructed as limitations of the invention's scope. It should be also noted that many specifics could be combined in various ways in a single or multiple embodiments. Thus it will be apparent to those skilled in the art that various modifications and variations can be made in the apparatus and processes of the present invention without departing from the spirit or scope of the invention.

The invention claimed is:

1. A portable electronic device comprising:
a speaker apparatus comprising a single vibrating element positioned inside a housing;
an air cavity within the housing, wherein the housing comprises a first outlet configured to emit a sound generated by the single vibrating element and the air cavity is coupled to a second outlet configured to emit a damped sound with respect to said sound from the first outlet, wherein the single vibrating element is configured to generate a controlled sound for both an earpiece and a hands free functionality;
wherein the speaker apparatus is configured to emit the sound originating from a first side of the single vibrating element at the first outlet;
wherein the speaker apparatus is configured to emit the damped sound originating from a second different side of the single vibrating element at the second outlet;
wherein the housing is configured such that the emitted sound at the first outlet is louder than emitted damped sound at the second outlet, and the single vibrating element is between the first outlet and the second outlet such that the single vibrating element is closer to the first outlet than the second outlet.

2. A portable electronic device according to claim 1, wherein the speaker apparatus is configured to emit sound originating from the second different side of the single vibrating element through the air cavity at the second outlet, and wherein the speaker apparatus is configured to emit sound originating from the first side of the single vibrating element at the first outlet without another air cavity therebetween.

3. A portable electronic device according to claim 1, wherein the first outlet and the second outlet are directed to different directions.

4. A portable electronic device according to claim 1, wherein the first outlet and the second outlet are situated on different sides of the speaker apparatus.

5. A portable electronic device according to claim 1, wherein the first outlet and the second outlet are situated on opposite sides of the speaker apparatus.

6. A portable electronic device according to claim 1, wherein the second outlet is configured to act as an earpiece speaker.

7. A portable electronic device according to claim 1, wherein the first outlet is configured to act as an integrated hands free speaker.

8. A portable electronic device according to claim 1, wherein the air cavity comprises a back cavity for the first outlet configured to act as an integrated hands free speaker of the speaker apparatus.

9. A portable electronic device according to claim 1, wherein the air cavity and the second outlet establish a resonator so that said resonator can be tuned to a given frequency.

10. A portable electronic device according to claim 1, wherein the first outlet and/or the second outlet comprise damping.

11. A portable electronic device according to claim 1, wherein the speaker apparatus comprises a single speaker structure for the wireless communication device.

12. A portable electronic device according to claim 11, wherein the single speaker structure comprises both earpiece speaker and integrated hands free speaker.

13. A portable electronic device according to claim 1, further comprising an additional air cavity, wherein the housing and the vibrating element are configured such that the additional air cavity is at the first outlet side of the vibrating element.

14. A portable electronic device according to claim 13, wherein the first outlet is configured to emit said sound from the additional air cavity.

15. A portable electronic device according to claim 13, wherein the additional air cavity comprises a front cavity and the air cavity comprises a back cavity.

16. A portable electronic device according to claim 13, wherein the additional air cavity and the first outlet establish a resonator tunable to a given frequency.

17. A portable electronic device according to claim 1, wherein the first outlet is at least partly coverable.

18. A portable electronic device according to claim 1, further comprising an external leak outlet positioned outside the housing of the speaker apparatus proximate the second side of the single vibrating element.

19. A portable electronic device according to claim 18, wherein the external leak outlet leads outside of the wireless communication device.

20. A portable electronic device according to claim 1, wherein the air cavity is divided into two cavities having a third sound outlet in between.

21. A portable electronic device according to claim 20, wherein the cavity next to the second outlet is configured to boost high frequency response of the earpiece.

22. A portable electronic device according to claim 1, further comprising a switch arranged to at least partly cover the first outlet.

23. A wireless communication device comprising;
a single speaker; and
a housing, wherein the single speaker is positioned inside the housing, wherein the single speaker is configured to combine an earpiece speaker functionality of the wireless communication device and a hands free speaker functionality of the wireless communication device, wherein the earpiece speaker functionality and the hands free speaker functionality have a common vibrating element and separate outlets on different sides of the vibrating element, wherein the single speaker is configured to generate a controlled sound for both the earpiece speaker functionality and the hands free speaker functionality, wherein the common vibrating element is configured to emit the sound originating from a first side of the common vibrating element at a first one of the separate outlets, wherein the wireless communication device is configured to emit the sound originating from a second different side of the common vibrating element at a second one of the separate outlets, wherein the wireless communication device is configured such that the emitted sound at the first outlet is louder than the emitted sound at the second outlet, and wherein the common vibrating element is between the first outlet and the second outlet such that the common vibrating element is closer to the first outlet than the second outlet.

24. A wireless communication device according to claim 23, wherein the common vibrating element is at the first one of the separate outlets without an air cavity therebetween.

25. A wireless communication device according to claim 23, wherein the first one of the separate outlets is acting as the hands free outlet and the second one of the separate outlets is acting as the earpiece outlet.

* * * * *